April 21, 1959     W. A. FRASER     2,883,291
GLASS COMPOSITION
Filed March 7, 1957
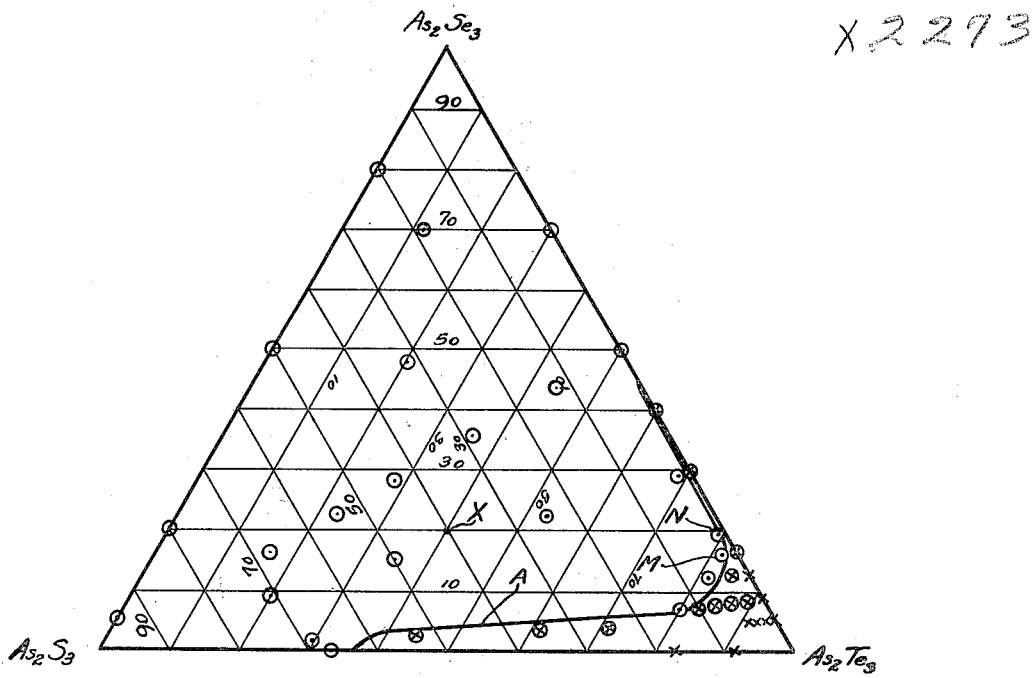
PERCENTAGES BY WEIGHT
INVENTOR.
WALTER A. FRASER
BY
Mitchell & Bechert
ATTORNEYS United States Patent Office 2,883,291
Patented Apr. 21, 1959

2,883,291

GLASS COMPOSITION

Walter A. Fraser, Chicago, Ill., assignor to Servo Corporation of America, New Hyde Park, N.Y., a corporation of New York Application March 7, 1957, Serial No. 644,690

3 Claims. (Cl. 106—47)

This invention relates to glasses produced from arsenic compounds in which the compounding element is from the B group of the VI column in the periodic table of elements.

This application is a continuation-in-part of U.S. application Serial No. 372,540, filed August 5, 1953, now abandoned.

In the indicated glass field, arsenic trisulfide and arsenic triselenide glasses have been known for many years. Also, mixtures of these two materials have been found to produce homogeneous glasses. These glasses have desirable properties in the infrared spectrum, but their transmission cutoff does not extend as far into the infrared as is often desirable. It is believed that ionic-radius limitations may be responsible for such transmission characteristics; and from this point of view arsenic tritelluride, or other arsenic compounds with elements (excluding oxygen) of the B group of the VI column in the periodic table, may be attractive. However, the difficulty with such other compounds as arsenic tritelluride is that they crystallize and cannot produce homogeneous glasses.

It is, accordingly, an object of the invention to provide a new field of glass compositions of the character indicated.

It is another object to provide improved infrared transmitting glasses.

A further object is to provide a glass meeting the above objects and yet substantially opaque to visible light.

Another object is to provide a new field of glasses comprising substantially only arsenic compounds in which the compounding elements are from the B group of the VI column of the periodic table.

A specific object is to provide a glass composition including arsenic tritelluride as an important and essential constituent.

Another specific object is to provide a glass which is substantially completely arsenic tritelluride and which contains a minimum of minor components.

Other objects and various further features of novelty and invention will be pointed out or will occur to those skilled in the art from a reading of the following specification in conjunction with the accompanying triaxial diagram. Said diagram depicts a field of glasses in which the substantial components are arsenic compounds and in which the compounding elements are from the B group of the VI column in the periodic table.

Briefly stated, I have found a new field of glasses comprising the fused reaction products of various mixtures of arsenic compounds of the heavier elements of the B group of the VI column in the periodic table, e.g. compounds of arsenic with sulfur, selenium and tellurium, the compound arsenic tritelluride being particularly attractive in extending the transmission cutoff well into the infrared spectrum, for example at least as far as 16 microns. However, the heavier compound, arsenic tritelluride, in the unadulterated state, crystallizes easy and cannot be made glassy at room temperature; but according to my invention I have found that the addition of suitable glass formers can make satisfactory glasses out of such heavier arsenic compounds as are otherwise characterized by crystallization, provided the amount added is sufficient to maintain the resulting glass non-crystalline at room temperature. For infrared-transmitting purposes, it is important that the glass-forming additive or additives shall themselves be infrared-transmitting, and I have found that either arsenic trisulfide or arsenic triselenide, or both of these B-group compounds of arsenic, serve as adequate glass former additives to arsenic tritelluride.

In the accompanying triaxial diagram, the left-hand corner represents 100 percent arsenic trisulfide ($As_2S_3$), the right-hand corner represents 100 percent arsenic tritelluride ($As_2Te_3$), and the upper corner represents 100 percent arsenic triselenide ($As_2Se_3$). Any point in the diagram represents a definite composition; for example, point X represents a composition within the invention containing 40% $As_2S_3$, 20% $As_2Se_3$, and 40 percent $As_2Te_3$.

The solid line A in the diagram is empirically determined and delineates the border at ordinary temperatures between compositions which will definitely form glasses and those which become crystalline. Close to this border I have plotted certain specific compositions which have been made. Those points inside the larger area defined by line A all represent glasses and are each identified by a small circle (○); good glasses will form for compositions anywhere within this larger area. Points inside the smaller area and designated by a cross (×) represent purely crystalline compositions, and other points in the smaller area are designated by a cross in a circle (⊗) and represent generally glassy materials with some crystal content.

The diagram thus shows that compositions along the base line between $As_2Se_3$ and $As_2Te_3$ are glassy to just beyond 50% $As_2Te_3$, i.e. to about 55%, the amount of $As_2Se_3$ being at least about 45%. If the percentage of $As_2Te_3$ is greater, then the addition of a relatively small amount of $As_2S_3$ is needed to prevent devitrification or crystallization of the melt on cooling. Along the base line of the triaxial diagram between $As_2S_3$ and $As_2Te_3$, the compositions are glassy to about 40% $As_2Te_3$, the amount of $As_2S_3$ being at least about 60% by weight. In similar manner, for the higher $As_2Te_3$ percentages along the base line between $As_2S_3$ and $As_2Te_3$, the addition of a relatively small quantity $As_2Se_3$ is needed to prevent devitrification. It is believed the different small necessary additions of $As_2S_3$ as compared with $As_2Se_3$ for these two cases may be attributed to the fact that the ionic radii of sulfur and tellurium are too far apart to form a glass easily, without a larger percentage of selenium in the structure than is the case where selenium and tellurium are the predominant negative ions.

For the two particular glasses identified as M and N in the diagram, transmission measurements show virtual opacity to visual light and substantial transmission well into the infrared region, at least to a wavelength of 16 microns. The exact compositions of those two glasses are tabulated as follows:

|  | Glass M | Glass N |
| --- | --- | --- |
| $As_2Te_3$ | [1] 81.3 | 78.7 |
| $As_2Se_3$ | 16.3 | 19.7 |
| $As_2S_3$ | 2.4 | 1.6 |

[1] Figures given are percentages by weight.

A relatively simple procedure may be employed in producing the fused heat-reaction composition provided by the invention. For example, in producing a glass of composition M, above-identified, a mixture by weight of about 81.3 parts of $As_2Te_3$, 16.3 parts of $As_2Se_3$, and 2.4 parts $As_2S_3$ is placed in an open Pyrex glass container and the container heated by means of a gas flame underneath a ventilation hood. The temperature of the materials in the container is brought to above the highest melting point of one of the constituents, for example to about 400° C. which is above the melting point of $As_2Te_3$ (362° C.), until a completely liquid melt is obtained. The melt is stirred and then cooled in air to room temperature. The product produced in this manner is non-crystalline.

It will be seen that I have described improved glass compositions and have delineated a new field of glasses. For infrared-transmitting purposes, my glasses have superior properties, for I have shown how advantage may be taken of desirable properties of otherwise crystalline compounds of arsenic with the heavier elements of the B group of column VI in the periodic table. In the specific case of glass compositions including $As_2Te_3$ as a component as determined from the large area encompassed by curve A of the triaxial diagram, I prefer that for best results within this area there should be at least 10 percent $As_2Te_3$ and that for further improved infrared transmission there should be at least 40% $As_2Te_3$, but because of other possible desirable propertics, such as indices of refraction, etc., I do not desire to be limited merely to at least 40 percent $As_2Te_3$.

For compositions containing at least 10% $As_2Te_3$ derived from the large area defined by curve A, the $As_2Te_3$ will generally range up to about 82%, although up to about 85% will yield acceptable glasses. In general, the compositions provided by the invention will include at least about 2% $As_2S_3$, at least about 4% $As_2Se_3$ with the balance essentially $As_2Te_3$ in amounts ranging from about 10% to 82% by weight. Other compositions include about 1 to 10% $As_2S_3$, about 75% to 85% $As_2Te_3$, the balance essentially $As_2Se_3$, as well as about 1% to 3% $As_2S_3$, about 75% to 85% $As_2Te_3$, the balance essentially $As_2Se_3$. Although the invention is concerned predominantly with those ingredients disclosed and claimed herein, it will be appreciated that small amounts of other ingredients may be tolerated in the composition without adversely affecting substantially the properties of the glass provided by the invention and it will be understood that the expression the "balance" when directed to the composition of the glass is not meant to exclude the presence of such other ingredients.

While I have described the invention in detail with particular reference to certain specific glasses, it will be understood that the invention is of broader scope and is defined in the claims which follow.

I claim:
1. An optical, infrared-transmitting glass comprising essentially a fused, heat-reaction product of a batch consisting essentially of the ingredients $As_2Te_3$, $As_2S_3$ and $As_2Se_3$ in amounts ranging from about 10% to 82% $As_2Te_3$, at least about 2% $As_2S_3$ and the balance essentially $As_2Se_3$ in an amount exceeding 4%, determined in accordance with the area defined in the accompanying triaxial diagram.

2. An infrared-transmitting glass composition consisting essentially of about 1% to 10% by weight of arsenic trisulfide, about 75% to 85% by weight of arsenic tritelluride, the balance being essentially arsenic triselenide.

3. A far-infrared-transmitting glass consisting essentially of about 1% to 3% by weight of arsenic trisulfide, about 75% to 85% by weight of arsenic tritelluride, the balance being essentially arsenic triselenide.

References Cited in the file of this patent

Mellor: Comprehensive Treatise on Inorganic and Theoretical Chemistry, 1930, Longmans, Green and Co., vol. 10, page 792.

Pelabon: Ann. Chim. Phys. 17, 526–566, 1910 (Chem. Abst., vol. 4, pages 10–11, 1910).

Journal of Optical Soc. of America, pages 823; 1154–1157, vol. 43 (1953).